United States Patent
Zulaika et al.

(10) Patent No.: US 11,128,206 B2
(45) Date of Patent: Sep. 21, 2021

(54) METHOD OF MANUFACTURING ROTOR OF ROTATING ELECTRICAL MACHINE

(71) Applicant: Hitachi Automotive Systems, Ltd., Hitachinaka (JP)

(72) Inventors: Mohdbasir Zulaika, Ibaraki (JP); Shinji Yamazaki, Ibaraki (JP); Shinjirou Watari, Ibaraki (JP); Tomohiro Fukuda, Ibaraki (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 127 days.

(21) Appl. No.: 16/488,891

(22) PCT Filed: Jan. 31, 2018

(86) PCT No.: PCT/JP2018/003183
§ 371 (c)(1),
(2) Date: Aug. 26, 2019

(87) PCT Pub. No.: WO2018/179806
PCT Pub. Date: Oct. 4, 2018

(65) Prior Publication Data
US 2020/0395827 A1 Dec. 17, 2020

(30) Foreign Application Priority Data
Mar. 29, 2017 (JP) .............................. JP2017-064166

(51) Int. Cl.
*H02K 15/03* (2006.01)
*H02K 1/27* (2006.01)
*H02K 15/12* (2006.01)

(52) U.S. Cl.
CPC ............. *H02K 15/03* (2013.01); *H02K 1/276* (2013.01); *H02K 15/12* (2013.01)

(58) Field of Classification Search
CPC ......... H02K 15/03; H02K 1/276; H02K 15/12
See application file for complete search history.

(56) References Cited

U.S. PATENT DOCUMENTS

| 8,058,767 B2 * | 11/2011 | Haruno | ................. | H02K 1/276 |
| | | | | 310/216.001 |
| 9,653,974 B2 * | 5/2017 | Masubuchi | ............ | H02K 15/03 |

(Continued)

FOREIGN PATENT DOCUMENTS

| JP | 2007-282392 A | 10/2007 |
| JP | 2008-054376 A | 3/2008 |

(Continued)

OTHER PUBLICATIONS

International Search Report with English translation and Written Opinion issued in corresponding application No. PCT/JP2018/003183 dated May 22, 2018.

(Continued)

*Primary Examiner* — Minh N Trinh
(74) *Attorney, Agent, or Firm* — Foley & Lardner LLP

(57) ABSTRACT

A method of manufacturing a rotor of a rotating electrical machine includes a method of manufacturing a rotor of a rotating electrical machine including a magnet and a rotor core forming storage space for storing the magnet. The rotor core forms an opening connected to the storage space. The method includes a first step of covering at least part of the opening with a first jig and a second jig having a non-adhesive resin film, a second step of putting an adhesive into the storage space, a third step of curing the adhesive in a state of being in contact with the non-adhesive resin film to form a plane surface facing an end ring of the rotating electrical machine, and a fourth step of separating the first jig and the second jig from the adhesive.

4 Claims, 9 Drawing Sheets

(56) References Cited

U.S. PATENT DOCUMENTS

| | | | |
|---|---|---|---|
| 9,653,975 B2* | 5/2017 | Ishimatsu | H02K 15/03 |
| 10,608,513 B2* | 3/2020 | Kino | H02K 1/28 |
| 2014/0375165 A1* | 12/2014 | Masubuchi | H02K 1/2766 |
| | | | 310/156.53 |
| 2016/0134179 A1 | 5/2016 | Nagai | |
| 2020/0395827 A1* | 12/2020 | Zulaika | H02K 15/12 |

FOREIGN PATENT DOCUMENTS

| | | |
|---|---|---|
| JP | 2011-55687 A | 3/2011 |
| JP | 2013-17281 A | 1/2013 |
| JP | 2016-093006 A | 5/2016 |

OTHER PUBLICATIONS

English translation of the Written Opinion issued in corresponding International Application No. PCT/JP2018/003183 dated May 22, 2018.
International Preliminary Report on Patentability issued in corresponding International Application No. PCT/JP2018/003183 dated Oct. 1, 2019.
Office Action issued in corresponding Japanese Application No. 2019-508658 dated Apr. 28, 2020 with English translation.
Office Action issued in corresponding Chinese Application No. 201880015736.2 dated Sep. 27, 2020, with English translation.

\* cited by examiner

METHOD OF MANUFACTURING ROTOR OF ROTATING ELECTRICAL MACHINE

TECHNICAL FIELD

The present invention relates to a method of manufacturing a rotor of a rotating electrical machine.

BACKGROUND ART

As a method of manufacturing a rotor of a rotating electrical machine, there are resin member filling and a drop injection method for fixing a rotor laminated core and a magnet. In the resin member filling method, for example, according to PTL 1, after inserting a permanent magnet into magnet storage space formed in a rotor laminated core, the permanent magnet is set in an injection mold. After the above, a liquid resin material is pressure-injected into the magnet storage space to cure the resin material in the mold.

In the drop injection method, after a liquid adhesive is injected into magnet insertion space formed in a rotor laminated core, a permanent magnet is inserted into the magnet storage space. After the above, the rotor is heated to cure the adhesive. In a case where a rotor is provided with a skew structure, when the filling work and the permanent magnet insertion work are completed on a first stage rotor laminated core, the first stage rotor laminated core is stacked on a second stage rotor laminated core, and the filling work and the permanent magnet insertion are repeated.

In the resin member filling method described above, since it is necessary to inject the resin component into the magnet storage space at a high injection pressure, there is a design restriction that a bridge shape provided between the first and second magnet storage spaces is not to be deformed. Furthermore, in order to fill the rotor laminated core with the resin member, a high mold clamping load is required for the filling mold, and the facility becomes large and expensive.

On the other hand, in the above-described drop injection method, it is necessary to seal with an end plate part so that the liquid adhesive does not flow out from the magnet storage space of the rotor laminated core. Furthermore, since the liquid adhesive leaks from between the iron core laminations, it becomes difficult to control an application amount of the liquid adhesive, and the inner and outer diameter dimensional defects of the rotor core occur.

CITATION LIST

Patent Literature

PTL 1: JP 2008-54376 A

SUMMARY OF INVENTION

Technical Problem

An object of the present invention is to provide a method of manufacturing a rotor of a rotating electrical machine with high reliability, in which an application amount of a liquid adhesive can be easily managed.

Solution to Problem

A method of manufacturing a rotor of a rotating electrical machine according to the present invention is a method of manufacturing a rotor of a rotating electrical machine including a magnet and a rotor core 400 forming storage space for storing the magnet, the rotor core forming an opening 430 connected to the storage space. The method includes a first step of covering at least part of the opening with a first jig and a second jig having a non-adhesive resin film, a second step of putting an adhesive into the storage space, a third step of curing the adhesive in a state of being in contact with the non-adhesive resin film to form a plane surface facing an end ring of the rotating electrical machine, and a fourth step of separating the first jig and the second jig from the adhesive.

Advantageous Effects of Invention

According to the present invention, in the method of manufacturing a rotor of a rotating electrical machine, an application amount of a liquid adhesive can be easily managed, and the reliability is improved.

DESCRIPTION OF EMBODIMENTS

Hereinafter, an embodiment of the present invention will be described with reference to the drawings.

Figure 1:
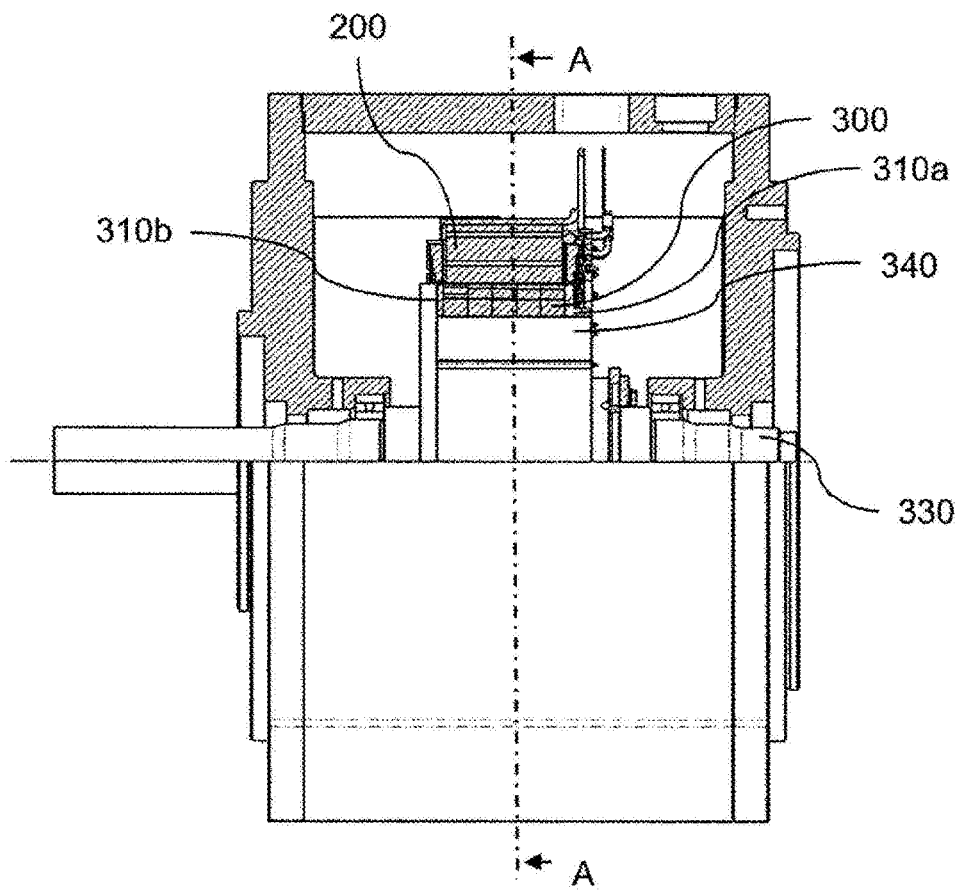
FIG. 1 is a partial cross-sectional view taken along a rotation axis direction of a rotating electrical machine 100.

FIG. 1 is a partial cross-sectional view taken along a rotation axis direction of a rotating electrical machine 100.

The rotating electrical machine 100 converts electrical energy into rotational energy. The rotating electrical machine of the present embodiment is used particularly for a car, and, in order to output large rotational energy, a radial direction of the rotating electrical machine 100 is formed to be large. For this reason, a centrifugal force applied to a magnet 500 provided in a rotor 300 described later is large. In the present embodiment, a fixing means for the magnet 500 will be described.

A stator 200 generates a magnetic field by current flowing through a conductor. A rotating shaft 330 is connected to the central portion of the rotor 300. The rotor 300 is rotated based on the magnetic field generated from the stator 200 and transfers rotational energy to the rotating shaft 330. The rotor 300 faces the stator 200 in the radial direction via an air gap.

A hub 340 is a member that is fixed to the rotating shaft 330 and for connecting the rotor 300 to the rotating shaft 330.

An end ring 310a fastens the hub 340 and the rotor 300. The end ring 310a is disposed at a position facing one side of the rotor 300 in an axial direction. An end ring 310b is used to secure a plane surface of the hub 340 and the rotor 300. The end ring 310b is disposed at a position facing the other side of the rotor 300 in the axial direction.

Figure 2:
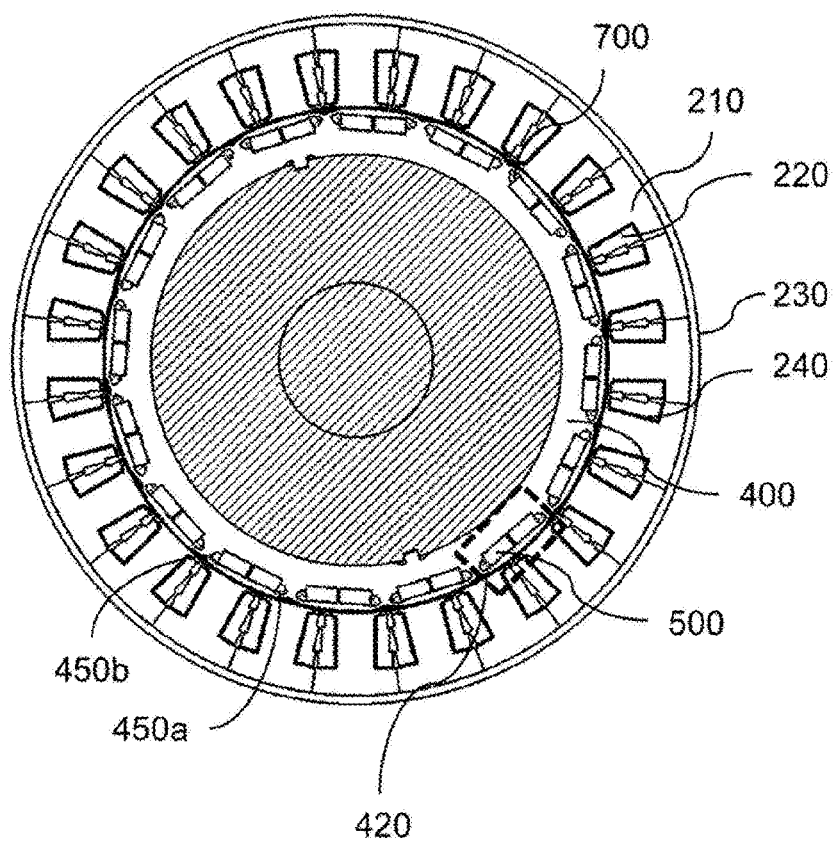
FIG. 2 is a cross-sectional view of the rotating electrical machine 100 as viewed in an arrow direction of a cross section AA of FIG. 1.

FIG. 2 is a cross-sectional view of the rotating electrical machine 100 as viewed in an arrow direction of a cross section AA of FIG. 1.

A coil 220 generates a rotating magnetic field from flowing alternating current to form a magnetic path in a stator core 210. The coil 220 is wound around and fixed to the stator core 210. A resinous bobbin 240 is used to insulate between the coil 220 and the stator core 210. The stator core 210 is arranged in a circular shape and shrink-fitted to an inner diameter side of a metal housing 230 so as to be fixed to the metal housing 230.

A rotor core 400 forms a magnetic path and forms magnet storage space 420 for storing the magnet 500. Further, the magnet storage space 420 is divided into a first air gap 450a on one side and a second air gap 450b on the other side with the permanent magnet 500 as a boundary.

The rotor core 400 faces stator core 210 in the radial direction via an air gap. The stator core 210 and the rotor core 400 can realize a low iron loss rotating electrical machine while improving the magnetic permeability by using a laminated silicon steel plate.

An adhesive 700 is a member for fixing the magnet 500 to the magnet insertion space 420. The first air gap 450a and the second air gap 450b are filled with the adhesive 700, and the adhesive 700 is interposed in the magnet insertion space 420 and covers the magnet 500. The adhesive 700 is, for example, liquid resin.

Figure 3:
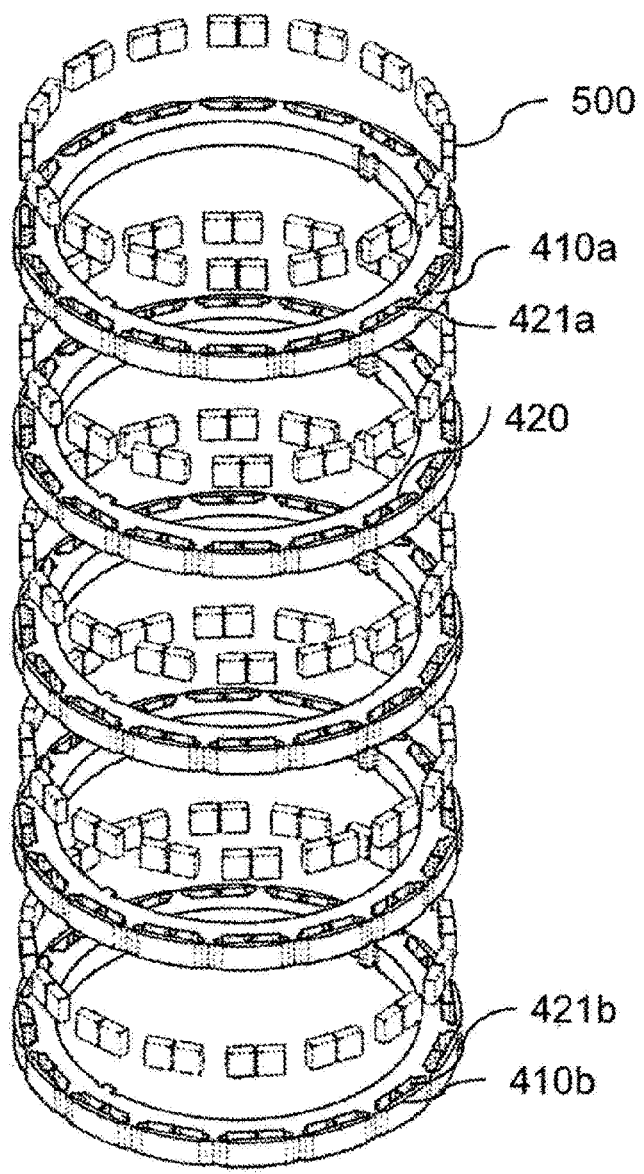
FIG. 3 is an exploded perspective view of a rotor 300.

FIG. 3 is an exploded perspective view of the rotor 300.

The rotor 300 includes a first rotor core 410a and a second rotor core 410b which are aligned along the rotation axis direction and skewed in a circumferential direction.

The first rotor core 410a forms first storage space 421a for storing the magnet 500. The second rotor core 410b stores the magnet 500 and forms second storage space 421b communicating with the first storage space 421a.

The first rotor core 410a is disposed at the top of the rotor core 400, and the second rotor core 410b is disposed at the bottom of the rotor core 400. A plurality of rotor cores are disposed in a skewed state between the first rotor core 410a and the second rotor core 410b.

Figure 4:
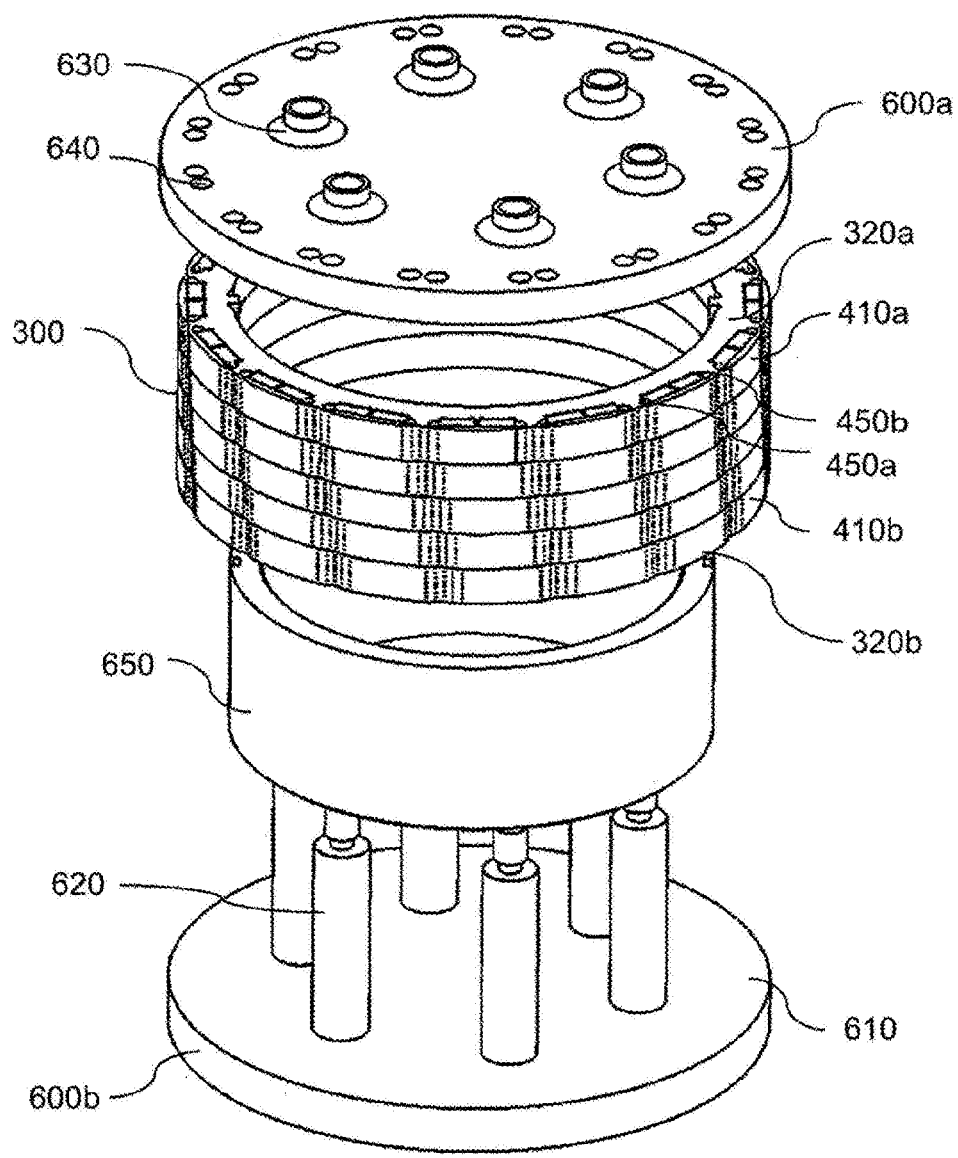
FIG. 4(a) is a perspective view showing a first step according to a method of manufacturing the rotor 300 of the rotating electrical machine 100.
FIG. 4(b) is a cross-sectional view showing a second step of the method of manufacturing the rotor 300 of the rotating electrical machine 100.
FIG. 4(c) is a cross-sectional view showing a third step of the method of manufacturing the rotor 300 of the rotating electrical machine 100.
FIG. 4(d) is a cross-sectional view showing a fourth step of the method of manufacturing the rotor 300 of the rotating electrical machine 100.
Figure 4:
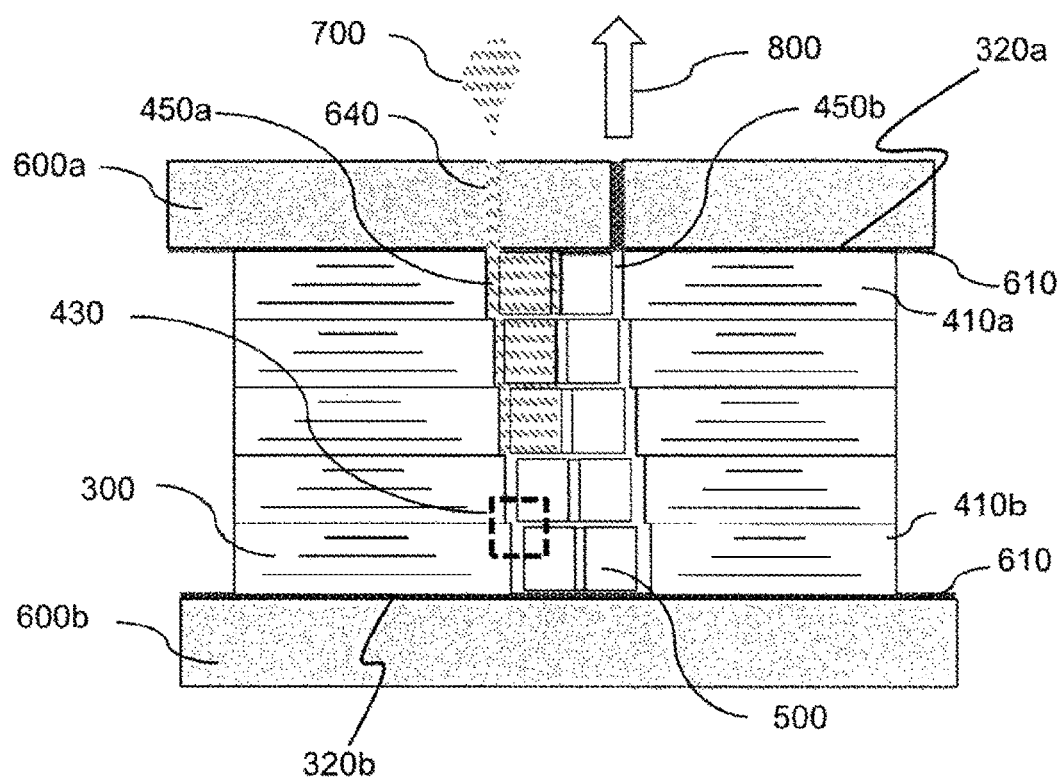
Figure 4:
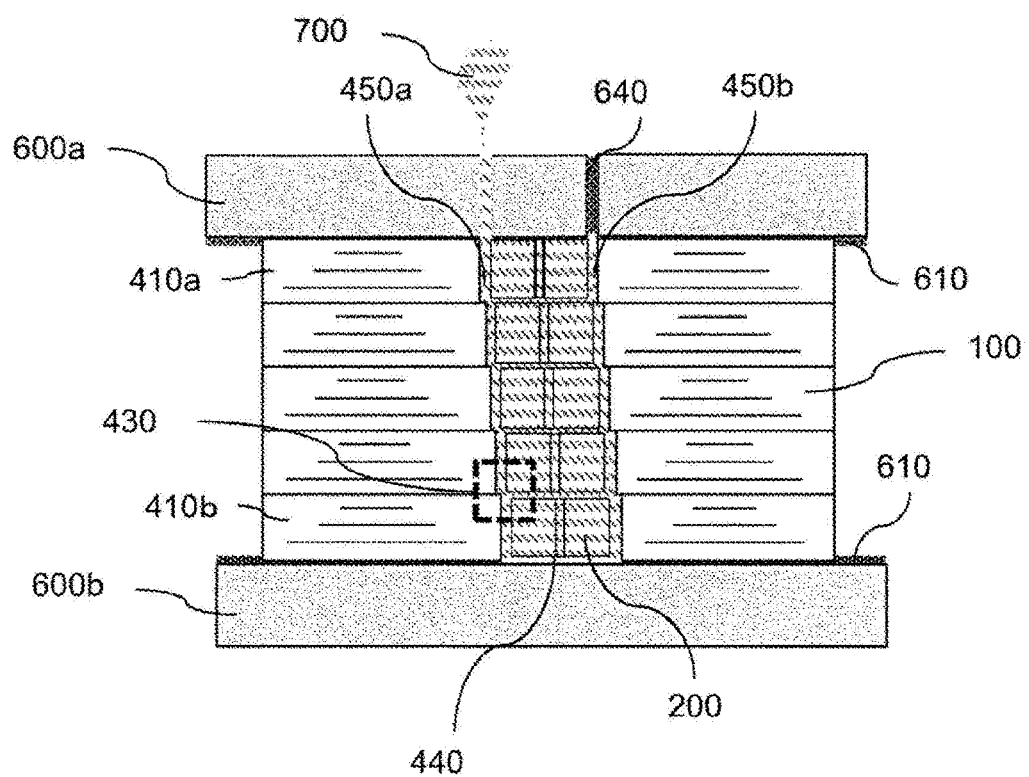
Figure 4:
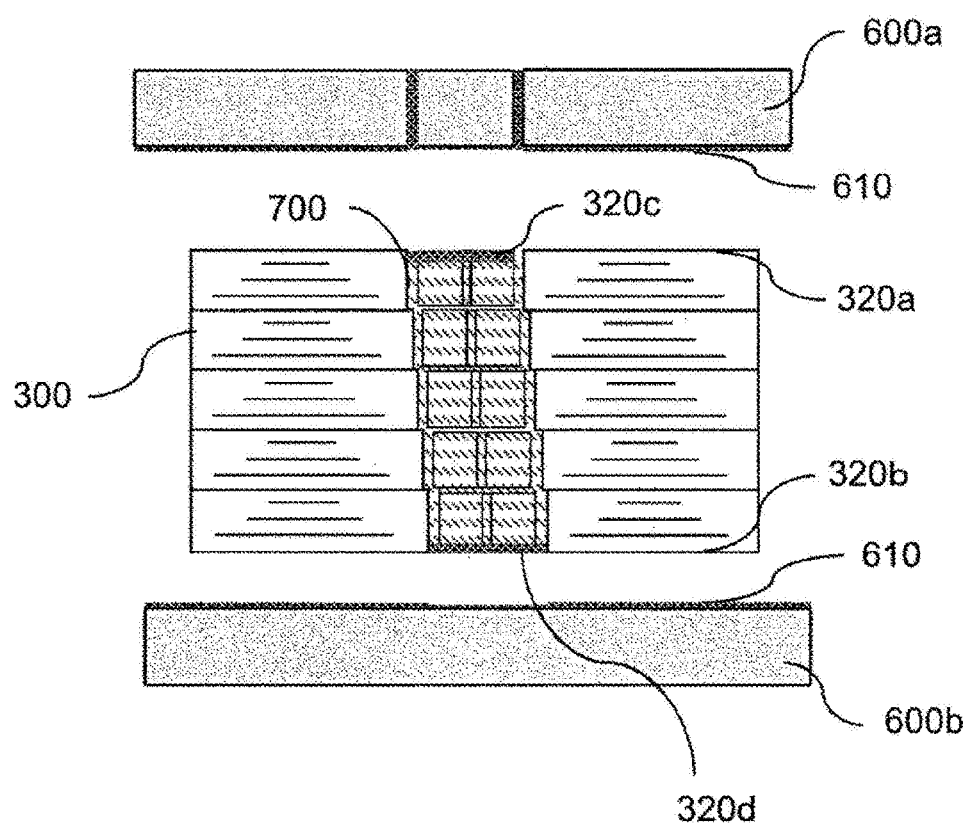

FIG. 4(a) is a perspective view showing a first step according to a method of manufacturing the rotor 300 of the rotating electrical machine 100.

The plane surface 320a is a surface of the first rotor core 410a and faces the end ring 310a described later. A surface of the end ring 310a and the plane surface 320a are required to be parallel in order to fasten the rotating shaft 330 (see FIG. 1).

The plane surface 320b is a surface of the second rotor core 410b and faces the end ring 310b described later. A surface of the end ring 310b and the plane surface 320b are required to be parallel in order to fasten the rotating shaft 330 (see FIG. 1).

A first jig 600a and a second jig 600b press the first rotor core 410a and the second rotor core 410b with an appropriate tightening force of a pressing nut 630 via a pressing shaft 620. Six of the pressing shafts 620 are provided in the circumferential direction on an inner diameter side of the rotor 300.

The first jig 600a faces the plane surface 320a, and the second jig 600b faces the plane surface 320b.

The first jig 600a is provided with adhesive injection holes 640 which are as many as the first air gaps 450a and the second air gaps 450b in the rotor 300. A flange shape is provided to improve the rigidity of the first jig 600a. The first jig 600a, the second jig 600b, the pressing shaft 620, and the pressing nut 630 are all metal parts in order to enhance the rigidity.

A jig hub 650 restrains the rotor core 400 of each stage in the circumferential direction in such a manner as communicating with the first storage space 421a and the second storage space 421b. The jig hub 650 is disposed in an inner diameter of the rotor core 400.

The jig hub 650 is fixed to the second jig 600b, and the second rotor core 410b is inserted. The magnet 500 is inserted into the magnet storage space 420 of the second rotor core 410b restrained in the circumferential direction by the jig hub 650. After the above, the insertion work of all the rotor cores 400 and the magnets 500 between the second rotor core 410b and the first rotor core 410a is repeatedly performed.

When the first rotor core 410a is assembled to the jig hub 650 and the magnet 500 is inserted, the first jig 600a and the second jig 600b press the first rotor core 410a and the second rotor core 410b with an appropriate tightening force of the pressing nut 630 via the pressing shaft 620.

FIG. 4(b) is a cross-sectional view showing a second step of the method of manufacturing the rotor 300 of the rotating electrical machine 100.

Then, while the first rotor core 410a and the second rotor core 410b are pressed, the adhesive 700 is dropped from the first air gap 450a via the first jig 600a.

An opening 430 is a portion that connects the magnet storage space 420 of the rotor cores adjacent to each other in the rotation axis direction.

A non-adhesive resin film 610 is formed on a surface of the first jig 600a that faces the plane surface 320a and a surface of the second jig 600b that faces the plane surface 320b.

The adhesive 700 is dropped into the first air gap 450a through the adhesive injection hole 640 formed on the first jig 600a, and air 800 flows out of the second air gap 450b.

The magnet storage space 420 communicating with the rotor core 400 from the upper stage to the lower stage is divided into the first rotor core 410a and the second rotor core 410b, and the adhesive 700 is injected from the first storage space 421a and flows into the second storage space 421b through the second jig 600b having the non-adhesive resin film 610. The pressure of the adhesive 700 continuously injected into the first storage space 421a is made higher than the atmospheric pressure of the second storage space 421b, and the adhesive 700 is gradually injected while the air in the second storage space 421b is pushed out to the outside air. When the liquid adhesive 700 is injected into the magnet storage space, it is possible to suppress the generation of air bubbles that deteriorate the inflow of the adhesive 700.

FIG. 4(c) is a cross-sectional view showing a third step of the method of manufacturing the rotor 300 of the rotating electrical machine 100.

The dropped adhesive 700 fills from the first rotor core 410a of the first air gap 450a to the second rotor core 410b.

A communication portion 440 is space connecting the first air gap 450a and the second air gap 450b in the circumferential direction. The communication portion 440 is formed to be thin enough to cause generation of a capillary phenomenon. The adhesive 700 that fills from the first rotor core 410a to the second rotor core 410b flows from the first air gap 450a into the second air gap 450b by a capillary phenomenon.

Note that dropping and curing work of the adhesive 700 are performed while the first jig 600a and the second jig 600b are pressed, so that the adhesive 700 does not flow between the laminations of the rotor core 400 while leakage of the adhesive 700 to the inner diameter and the outer diameter of the rotor 300 is prevented, and an unnecessary increase in stack thickness can also be prevented.

Then, the adhesive 700 is cured in a state where the non-adhesive resin film 610 is in contact with the plane surface 320a and the plane surface 320b.

Further, by dropping the adhesive 700 only in the first air gap 450a, the adhesive 700 is injected until the openings 430 communicating with the first rotor core 410a to the second rotor core 410b is all filled. Then, the liquid surface of the adhesive 700 reaches the second air gap 450b, and the filling with the adhesive 700 can be visually confirmed.

FIG. 4(d) is a cross-sectional view showing a fourth step of the method of manufacturing the rotor 300 of the rotating electrical machine 100.

After the adhesive 700 is cured, the first jig 600a and the second jig 600b are separated from the plane surface 320a and the plane surface 320b.

When the non-adhesive resin film 610 formed on the first jig 600a separates the plane surface 320a from the first jig 600a, the non-adhesive substance is partially transferred to an adhesive exposed surface 320c, and remains on the adhesive exposed surface 320c. The non-adhesive substance is to form the non-adhesive film 610 of the first jig 600a. The above similarly applies to an adhesive exposed surface 320d.

By coating an upper mold (the first jig 600a in the present embodiment) and a lower mold (the second jig 600b in the present embodiment) of the rotor assembly jig with the non-adhesive resin, the jig and the rotor core 210 can be separated even after the rotor 300 and the jig are fixed by the liquid adhesive 700.

Furthermore, the magnet storage space 420 in the skewed rotor core 210 is connected from the upper surface to the end surface of the rotor core 210, the magnet 500 is inserted into all stages of the rotor core 210, and a liquid adhesive 710 can be injected. When the rotor laminated core is fixed to the magnet, no auxiliary parts are required, and the surface that can be cooled on the magnet and the rotor core is improved, which leads to improvement in the performance of the rotor.

In the present embodiment, after the adhesive 700 is cured, the non-adhesive resin film 610 is formed to separate the first jig 600a and the second jig 600b from the plane surface 320a and the plane surface 320b. Since the non-adhesive resin film 610 is transferred to the adhesive exposed surface 320c and becomes thin, it is necessary to form the non-adhesive resin film 610 again after the work. However, in order to maintain the flatness of the non-adhesive resin film 610, the first jig 600a and the second jig 600b are cleaned to form the non-adhesive resin film 610. Furthermore, since a plane surface during molding is digitized in order to prevent unevenness of the non-adhesive resin film 610, the management of the jig is expensive.

In view of the above, although the non-adhesive resin film 610 of the present embodiment is configured by applying fluorine, a non-adhesive resin sheet may also be disposed. By disposing a disposable non-adhesive sheet between the first jig 600a and the plane surface 320a, the plane surface 320a and the plane surface 320b can be separated in a similar manner as the non-adhesive resin film 610. Furthermore, the flatness of the disposable non-adhesive sheet needs to be managed only at the time of purchase, management of the jig can also be simplified.

Figure 5:
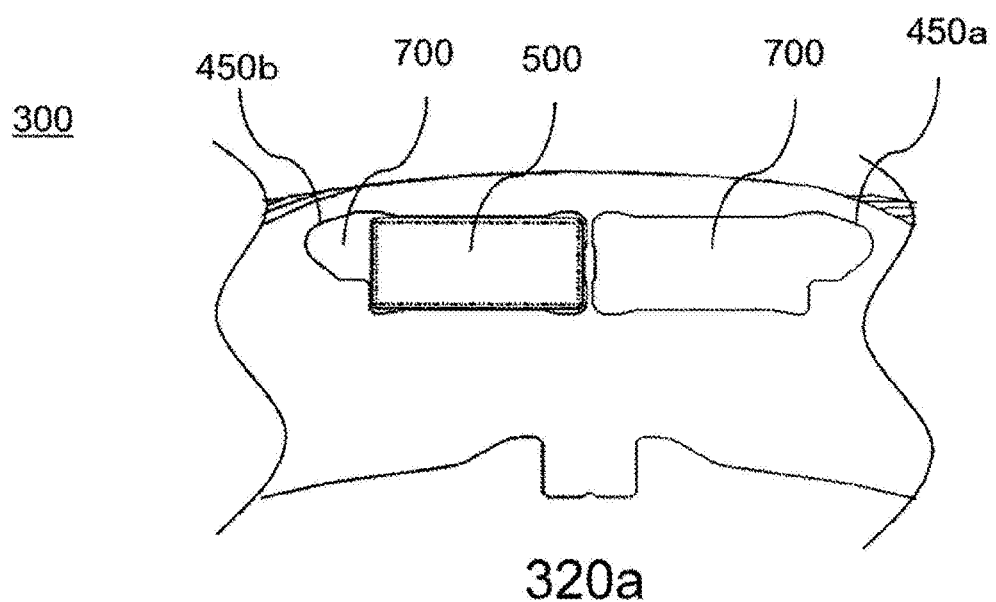
FIG. 5 is a partially enlarged view of a plane surface 320a of a first rotor core 410a and a plane surface 320b of a second rotor core 410b after an adhesive 700 is cured on the rotor 300.
Figure 5:
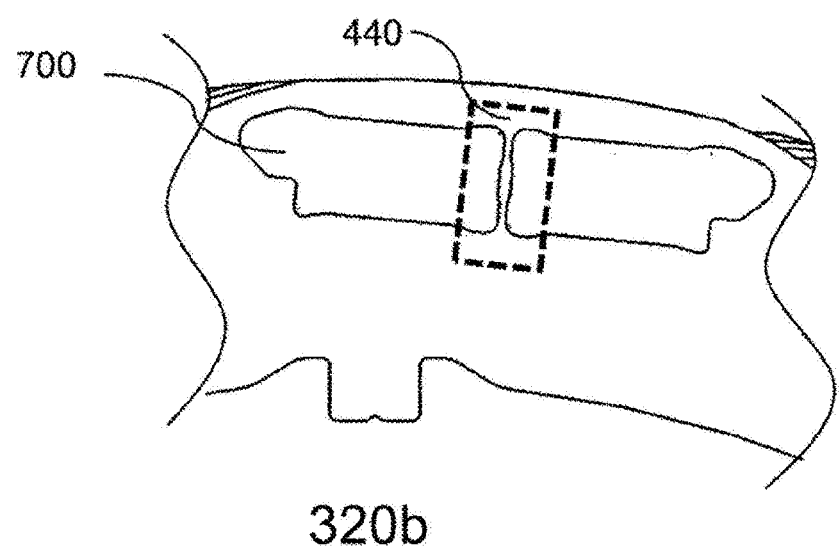

FIG. 5 is a partially enlarged view of the plane surface 320a of the first rotor core 410a and the plane surface 320b of the second rotor core 410b after the adhesive 700 is cured on the rotor 300.

The first air gap 450a is filled with the adhesive 700, and a surface of the magnet 500 stored in the first air gap 450a is covered with the adhesive 700.

A liquid level of the adhesive 700 with which the second air gap 450b is filled is lower than the plane surface 320a. That is, the liquid level of the adhesive 700 with which the second air gap 450b is filled is lower than a liquid level of the adhesive 700 with which the first air gap 450a is filled. In this manner, cleaning of the first jig 600a can be omitted without the adhesive curing in the adhesive injection hole 640, and the controllability can be improved. Further, in the above manner, a contact area between the magnet and the air is increased, so that the magnet cooling performance is improved and the performance of the motor is also improved.

Further, in the above manner, a liquid level of the adhesive 700 can be checked from the upper surface of the plane surface 320a.

On the side of the plane surface 320b, both the first air gap 450a and the second air gap 450b are filled with the adhesive 700, and the adhesive 700 covers the surface of the magnet 500 stored in the first air gap 450a and the second air gap 450b.

Figure 6:
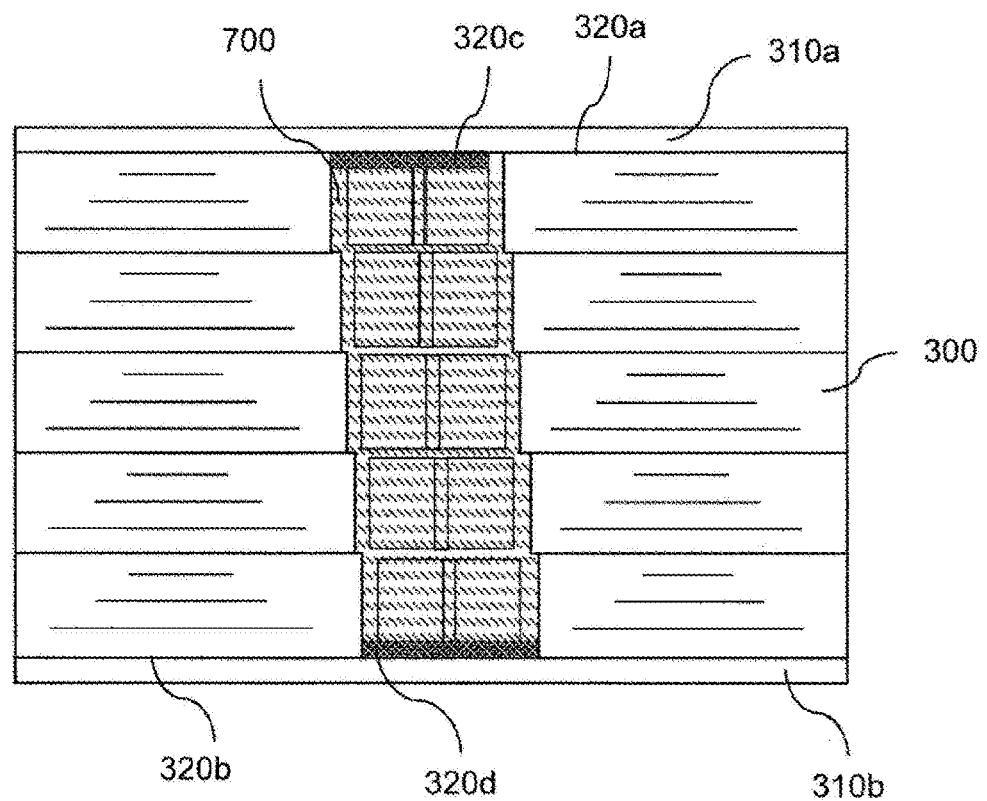
FIG. 6 is a cross-sectional view of the rotor 300 in which an end ring 310a and an end ring 310b are connected.

FIG. 6 is a cross-sectional view of the rotor 300 to which the end ring 310a and the end ring 310b are connected.

The rotor 300 causes the end ring 310a to face the plane surface 320a and the plane surface 320c, and causes the end ring 310b to face the plane surface 320b and the plane surface 320d.

The parallelism required for the plane surface 320a, the plane surface 320b, the plane surface 320c, and the plane surface 320d is formed on the first jig 600a and the second jig 600b, so that the fastening strength of the hub 340 and the end ring 310 can be ensured.

REFERENCE SIGNS LIST 100 rotating electrical machine
200 stator
210 stator core
220 coil
230 metal housing
240 bobbin
300 rotor
310a end ring
310b end ring
320a plane surface
320b plane surface
320c adhesive exposed surface
320d adhesive exposed surface
330 rotating shaft
340 hub
400 rotor core
410a first rotor core
410b second rotor core 420 magnet storage space
421a first storage space
421b second storage space
430 opening
440 communication portion
450a first air gap
450b second air gap
500 magnet
600a first jig
600b second jig
610 non-adhesive resin film
620 pressing shaft
630 pressing nut
640 adhesive injection hole
650 jig hub
700 adhesive
800 air

The invention claimed is:

1. A method of manufacturing a rotor of a rotating electrical machine including a magnet and a rotor core forming storage space for storing the magnet, the rotor core forming an opening connected to the storage space, the method of manufacturing the rotor of the rotating electrical machine comprising:
   covering at least part of the opening with a first jig and a second jig having a non-adhesive resin film;
   putting an adhesive into the storage space;
   curing the adhesive in a state of being in contact with the non-adhesive resin film to form a plane surface facing an end ring of the rotating electrical machine; and
   separating the first jig and the second jig from the adhesive,
   wherein
      the storage space is divided by the magnet by a first air gap and a second air gap,
      the rotor core comprises a communication portion for communicating the first air gap and the second air gap, and
      the covering further comprising discharging air from the second air gap through the communication portion while injecting the adhesive from the first air gap.

2. The method of manufacturing a rotor of a rotating electrical machine according to claim 1, wherein
   on the first jig and the second jig, instead of the non-adhesive resin film, disposing a non-adhesive resin sheet between the first jig and the first rotor core, and between the second jig and the second rotor core.

3. The method of manufacturing a rotor of a rotating electrical machine according to claim 1, wherein
   the covering further comprising a first rotor core and a second rotor core in a rotation axis direction by the first jig and the second jig.

4. A method of manufacturing a rotor of a rotating electrical machine including a magnet and a rotor core forming storage space for storing the magnet, the rotor core forming an opening connected to the storage space, the method of manufacturing the rotor of the rotating electrical machine comprising:
   covering at least part of the opening with a first jig and a second jig having a non-adhesive resin film;
   putting an adhesive into the storage space;
   curing the adhesive in a state of being in contact with the non-adhesive resin film to form a plane surface facing an end ring of the rotating electrical machine; and
   separating the first jig and the second jig from the adhesive, wherein:
      the rotor core includes a first rotor core and a second rotor core that are aligned along a rotation axis direction and skewed in a circumferential direction,
      the first rotor core forms first storage space for storing a first magnet constituting the magnet,
      the second rotor core forms second storage space for storing a second magnet constituting the magnet and communicating with the first storage space, and
      the putting the adhesive comprising injecting the adhesive through a portion communicating the first storage space and the second storage space.

* * * * *